Grover & Baker.
Sewing Machine.

No 568 Reissued Jun. 15, 1858.

Inventors.
William O. Grover
& William E. Baker

Grover & Baker.
Sewing Machine.

No 568 Reissued Jun. 15, 1858.

Inventors.
William O. Grover
William E. Baker

UNITED STATES PATENT OFFICE.

W. O. GROVER AND W. E. BAKER, OF BOSTON, MASSACHUSETTS, ASSIGNORS TO THE GROVER & BAKER SEWING MACHINE COMPANY.

IMPROVEMENT IN SEWING-MACHINES.

Specification forming part of Letters Patent No. 7,931, dated February 11, 1851; Reissue No. 568, dated June 15, 1858.

*To all whom it may concern:*

Be it known that we, WILLIAM O. GROVER and WILLIAM E. BAKER, both at present of Boston, Massachusetts, have invented certain new and useful Improvements in Sewing-Machines, for which Letters Patent were duly issued to us on the 11th day of February, A. D. 1851, which Letters Patent are inoperative and invalid. We, WILLIAM O. GROVER and WILLIAM E. BAKER aforesaid, do therefore now make known the following as a full, clear, and exact amended description and specification of claims of our invention.

Figure 1:
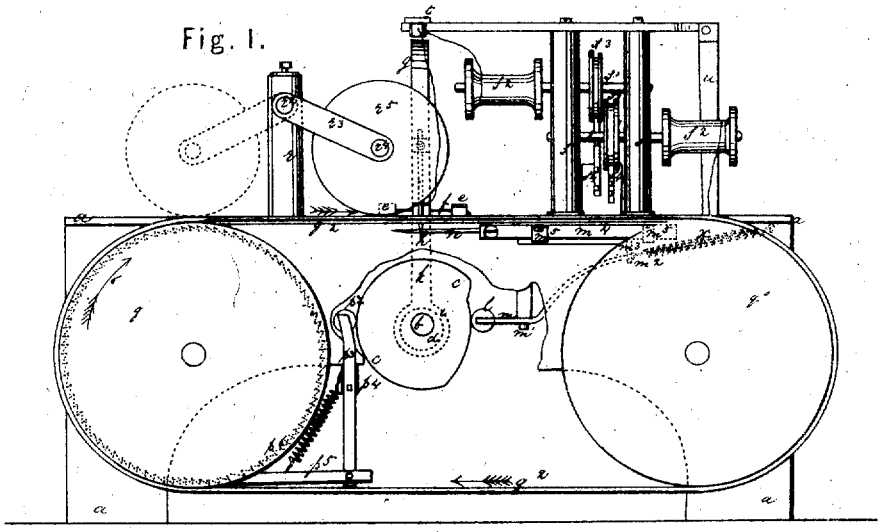
Figure 2:
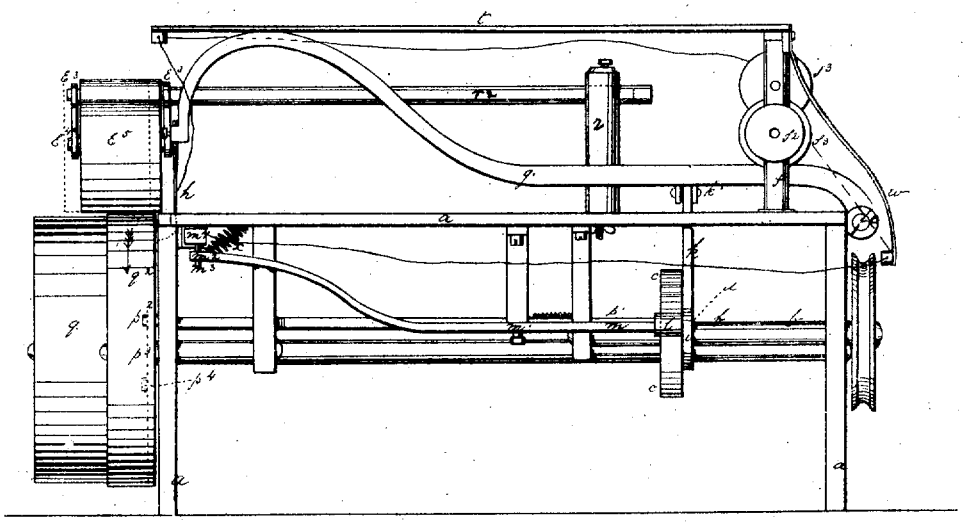
Figure 3:
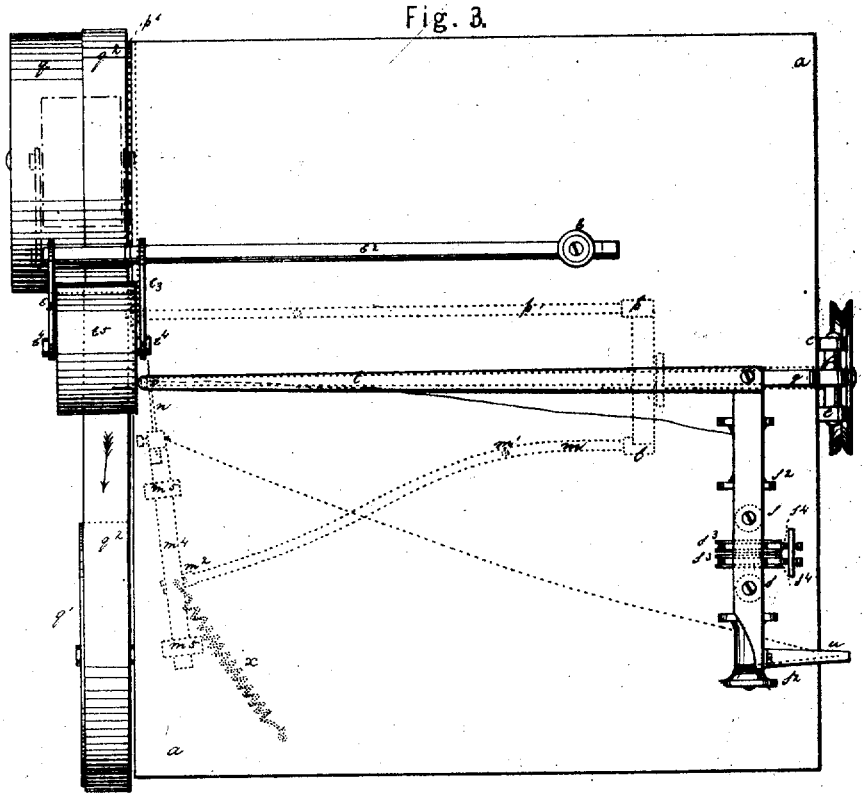
Figure 4:
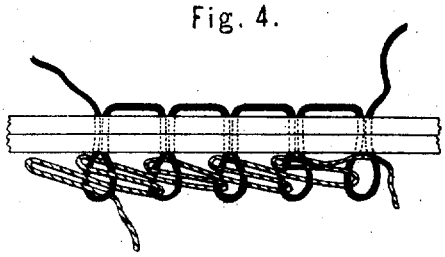

In the drawings, Figure 1 is a front elevation of the machine. Fig. 2 is a side elevation thereof. Fig. 3 is a plan of the machine. Fig. 4 is a sketch of the stitch made by the machine, the upper needle-thread being colored red and the lower blue.

This machine makes what is termed a "double-looped stitch" by the interlocking of two threads, which stitch, on the upper side of the cloth, is like that made by shuttle sewing-machines showing one thread only, while on the under side there is a species of chain entwined of both threads; and in order to make this stitch one eye-pointed needle descends through the material to be sewed and forms a loop of its thread, owing to its curvature, in the same way that the needle does in the Howe machine. Another eye-pointed non-perforating instrument then advances (the plane in which it moves being parallel with the cloth, or nearly so) and passes its thread through this loop, between the thread and the perforating-needle. The perforating-needle then rises out of the cloth, leaving its loop around the non-perforating or under needle. This latter then recedes a little, spreading a loop of its thread by virtue of its motion and the friction of the loop of upper thread, and the upper needle descends again between the lower needle and its thread-loop. The lower needle then backs entirely out of the loop of upper thread, which it held, advances again, and enters a new loop of the upper needle-thread, and by a repetition of these operations in succession a stitch is formed.

Now, our invention consists in combining two eye-pointed instruments operating to make a stitch, substantially in the manner thus and hereinafter described, with a feed apparatus to which the cloth is not attached positively, substantially as hereinafter specified, and with a table or stationary equivalent therefor to support the cloth against the downward thrust of the perforating-needle, or so that it may be presented properly to the feed, the combination being substantially such as is hereinafter specified.

In the drawings, *a a* is a strong table to support the work to be sewed, which serves to assemble together all parts of the machine. Beneath the surface of this table is supported in proper bearings a shaft, *b b*, which may be driven by a crank-pulley on gearing, and on this shaft is fixed a cam, *c c*, and an eccentric, *d*. At one side of the table are two lugs, *e e*, which support a short rock-shaft, *f*, to which is fastened a needle-bar, *g*, carrying at the free end an eye-pointed perforating-needle, *h*, and around the eccentric is a ring or strap, *i*, to which is attached a rod, *k*, whose other end is by a pivot secured to the needle-bar at *k'*. A revolution of the main shaft will therefore cause the needle to descend through the cloth and through a small hole in the table and rise up again.

Resting upon the cam *c c* is a roller, *l*, mounted on one end of a lever, *m*, pivoted at *m'*, while its other end is forked at $m^2$, and embraces a pin, $m^3$, depending from a bar, $m^4$, supported in suitable guides, $m^5$, and this bar carries a non-perforating eye-pointed instrument or lower needle, *n*.

To the depending pin is attached one end of a coiled spring, *x*, whose other end is attached to some stationary part of the machine, and this spring tends to draw the needle backward and to keep the roller *l* pressed upon the cam, these parts being such that a revolution of the main shaft causes the lower needle to move in such time and direction as to make the stitch described. Upon the same cam, *c*, rests another roller, *p*, supported on one end of a lever, *p'*, pivoted to a hanger on the under side of the table, and the other end of this lever is connected at $p^2$ with another lever, $p^3$, pivoted at $p^4$, the other end of the latter lever being pivoted to a hand or pawl, $p^5$, that takes into a ratchet-wheel, $p^6$. There is a small coiled spring to hold the pawl up to its work, and another, similar to spring $x$, to cause the roller $p$ to bear upon the face of cam $c$, the whole connection being such that each rotation of the main shaft causes the ratchet-wheel to move in the direction of the arrow $o$. This wheel is mounted upon a proper shaft, and upon the same shaft, and so secured as to turn with the ratchet-wheel, is a pulley, $q$, and at the other corner, on the same side of the machine, is supported upon a proper shaft another pulley, $q'$. A stout belt, $q^2$, encircles these two pulleys, and the upper surface of this belt is level, or nearly so, with the upper surface of the table. From the table rises a standard, $r$, which fits into a hole in the table, and is screwed at its lower end, a nut being applied to the screw, so that the standard may be turned on its own axis and held in any required position. The top of this standard is pierced, and through the hole passes a rod, $r^2$, which may be slid out and in and confined in any desired position by a small set-screw. Upon this standard are mounted two links or radius-bars, $r^3$ $r^3$, whose other ends embrace the ends of a shaft, $r^4$, which carries a roller, $r^5$. This whole connection is such that the roller can be lifted up from the belt or caused to rest upon it nearly in front of the upper needle; or it may be made to rest partly upon the belt and partly upon the table, a little nearer the ratchet-wheel than is shown in Fig. 1. Now, the cloth to be sewed is to be laid upon the table and upon the belts, and is pressed upon the belts by the weight of the upper roller, $r^5$, so that when the belt moves the cloth will move with it, while at the same time the cloth can be turned and twisted by hand, so as to sew seams of various curvatures, and the roller $r^5$, being supported as described, will accommodate itself to various thicknesses of material and admit of the passage of seams.

At the back of the machine are two standards, $s$ $s$, supporting shaft $s'$ $s'$, in which are mounted bobbins $s^2$ $s^2$, and retarding-wheels $s^3$ $s^3$, which are pressed upon by springs $s^4$ $s^4$, whose force may be regulated by set-screws. These standards also carry a cross-piece, to which are fastened two tension-springs, $t$ for the upper and $u$ for the lower thread. Thread is wound upon these bobbins and passed through eyes in the tension-springs, and then through the eyes of the upper and lower needles, as shown in Fig. 2, and cloth introduced in position, as before stated, by lifting up the upper roller. The machine is then ready to work, and will, if the shaft be revolved, make a series of stitches, substantially in the manner before described, the shape and relative position of the eccentric and cam and their connections being such, substantially as shown in the drawings, that the needles keep proper relative time in their motions, and that the cloth moves forward when the upper needle is out of it; but for a better understanding of the working of the machine it is necessary to observe that the direction of progression of the cloth is from the point toward the base of the lower needle nearly, and that the lower needle does not reciprocate in lines parallel to the feed, but inclined thereto, as may be observed by looking at the plan. The effect of this arrangement is to cause the loop of upper needle-thread, which is around the lower needle, to be spread across the line of feed by the motion of the cloth, while the eye of the lower needle is on the other side of the line of the seam. That part of the lower thread, therefore, between which and the lower needle the upper needle passes will almost always keep out of the way of the upper needle, and this arrangement causes fewer stitches to be imperfect than would be the case if the lower needle moved to and fro in the line of the feed. Now, we are aware of the fact that a feed which grasps the cloth between two surfaces and admits of turning it was invented prior to our invention of this machine, and that in so far this feed was substantially like that herein described.

We claim as of our invention only the combination of these three elements, viz:

First, a mechanism for making a stitch substantially such as described, and consisting of an eye-pointed perforating-instrument and a non-perforating eye-pointed instrument, operating substantially as specified; second, a stationary table or support for the material to be sewed, substantially such as specified, and performing the duties substantially as set forth; and, third, a feed in which the cloth is grasped between two surfaces without being attached to either of them, substantially in the manner and for the purpose set forth, meaning to claim as of our invention no one of these elements severally or apart from the others, but only the three in combination.

In testimony whereof we have hereunto subscribed our names, in the city of Boston, on this 10th day of February, A. D. 1858.

W. O. GROVER.
WM. E. BAKER.

In presence of—
S. J. GORDON,
JAMES H. BROWN.